US009699764B2

(12) United States Patent
Wang et al.

(10) Patent No.: US 9,699,764 B2
(45) Date of Patent: Jul. 4, 2017

(54) METHOD FOR CARRYING OUT MULTIMEDIA BROADCAST MULTICAST SERVICE, HOME BASE STATION AND USER EQUIPMENT

(71) Applicant: FUJITSU LIMITED, Kawasaki-shi, Kanagawa (JP)

(72) Inventors: Weiwei Wang, Beijing (CN); Ningjuan Chang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 14/226,469

(22) Filed: Mar. 26, 2014

(65) Prior Publication Data
US 2014/0204830 A1 Jul. 24, 2014

Related U.S. Application Data

(63) Continuation of application No. PCT/CN2011/080507, filed on Sep. 30, 2011.

(51) Int. Cl.
*H04W 72/00* (2009.01)
*H04W 24/00* (2009.01)
(Continued)

(52) U.S. Cl.
CPC ......... *H04W 72/005* (2013.01); *H04W 24/00* (2013.01); *H04W 48/10* (2013.01); *H04W 4/06* (2013.01); *H04W 84/045* (2013.01)

(58) Field of Classification Search
CPC ... H04W 72/042; H04W 72/005; H04W 4/06; H04W 28/0268; H04W 28/0215;
(Continued)

(56) References Cited

U.S. PATENT DOCUMENTS 8,660,049 B2    2/2014  Katayama et al.
8,942,156 B2    1/2015  Yang et al.
(Continued)

FOREIGN PATENT DOCUMENTS

CN    101321101 A    12/2008
CN    101523823 A     9/2009
(Continued)

OTHER PUBLICATIONS

Office Action issued by the Japan Patent Office for corresponding Japanese Patent Application No. 2014-532214, mailed on Aug. 11, 2015, with an English translation.
(Continued)

*Primary Examiner* — Dung B Huynh
(74) *Attorney, Agent, or Firm* — Myers Wolin, LLC

(57) ABSTRACT

A method for carrying out a multimedia broadcast multicast service, a home base station, a network management system of the home base station and user equipment. The method includes: acquiring, by a home network side entity, multimedia broadcast multicast service (MBMS) configuration information of a macro cell, the MBMS configuration information of the macro cell comprising first MBMS configuration information, the first MBMS configuration information comprising position information of a multimedia broadcast multicast single frequency network (MBSFN) subframe in the macro cell; and configuring a subframe of a closed subscriber group (CSG) cell at a position which is the same as that of the MBSFN subframe of the macro cell into a first almost blank subframe (ABS) or into a first ABS and MBSFN subframe, according to the acquired first MBMS configuration information, so that the user equipment (UE) is capable of receiving the MBMS of the macro cell.

19 Claims, 11 Drawing Sheets

(51) Int. Cl.
*H04W 48/10* (2009.01)
*H04W 4/06* (2009.01)
*H04W 84/04* (2009.01)

(58) Field of Classification Search
CPC ... H04L 5/0032; H04L 5/0035; H04L 5/0051; H04L 5/0053; H04L 5/0096; H04L 47/2458; H04L 47/6275; H04L 47/6285; H04L 12/5693; H04L 45/00; H04L 45/302; H04L 45/40; H04L 45/502; H04L 45/583

See application file for complete search history.

(56) References Cited

U.S. PATENT DOCUMENTS

| | | | |
|---|---|---|---|
| 2007/0201511 A1* | 8/2007 | Saito | H04H 20/02 370/466 |
| 2008/0207151 A1* | 8/2008 | Rinne et al. | H04B 7/0871 455/140 |
| 2009/0271188 A1* | 10/2009 | Agapi | G10L 21/0208 704/233 |
| 2010/0054237 A1* | 3/2010 | Han et al. | H04J 3/0638 370/350 |
| 2010/0272065 A1* | 10/2010 | Lee et al. | H04W 36/02 370/331 |
| 2010/0322135 A1* | 12/2010 | Van Lieshout et al. | H04W 72/005 370/312 |
| 2011/0105135 A1* | 5/2011 | Krishnamurthy | H04W 16/10 455/450 |
| 2011/0211519 A1* | 9/2011 | Katayama et al. | H04L 5/0032 370/312 |
| 2011/0263260 A1* | 10/2011 | Yavuz et al. | H04W 36/0083 455/437 |
| 2011/0294508 A1* | 12/2011 | Min | H04W 36/0083 455/436 |
| 2012/0113843 A1* | 5/2012 | Watfa | H04W 72/1289 370/252 |
| 2012/0155362 A1* | 6/2012 | Montojo et al. | H04W 72/082 370/312 |
| 2013/0003640 A1* | 1/2013 | Yang | H04W 72/005 370/312 |
| 2013/0028161 A1* | 1/2013 | Maeda et al. | H04L 5/0048 370/311 |
| 2013/0033998 A1* | 2/2013 | Seo | H04W 24/00 370/252 |
| 2013/0250773 A1* | 9/2013 | Ohta et al. | H04B 7/155 370/241 |
| 2013/0303152 A1* | 11/2013 | Kim | H04W 72/082 455/422.1 |

FOREIGN PATENT DOCUMENTS

| | | |
|---|---|---|
| CN | 102164347 A | 8/2011 |
| CN | 102170612 A | 8/2011 |
| EP | 2 364 052 A1 | 9/2011 |
| JP | 2011-181993 A | 9/2011 |
| JP | 2013-520887 A | 6/2013 |
| WO | 2010083451 A2 | 7/2010 |
| WO | 2011044558 A1 | 4/2011 |
| WO | 2011/100886 A1 | 8/2011 |
| WO | WO 2011111111 A1 * | 9/2011 ............ H04B 7/155 |

OTHER PUBLICATIONS

Extended European search report with supplementary European search report and the European search opinion issued for corresponding European Patent Application No. 11873193.4, mailed on Feb. 19, 2015.
International search report issued for corresponding international application No. PCT/CN2011/080507, mailed Jul. 12, 2012.
Notice of Preliminary Rejection issued by the Korean Intellectual Property Office for corresponding Korean Patent Application No. 10-2014-7009565, mailed on May 27, 2015, with English translation.
First Office Action and search report issued on Jul. 29, 2016 for counterpart Chinese patent application No. 201180072069.X with an English translation.
Second Office Action issued by the State Intellectual Property Office of China for corresponding Chinese Patent Application No. 201180072069.X, dated Mar. 8, 2017, with an English translation.

* cited by examiner

METHOD FOR CARRYING OUT MULTIMEDIA BROADCAST MULTICAST SERVICE, HOME BASE STATION AND USER EQUIPMENT

CROSS-REFERENCE TO RELATED APPLICATIONS

This is a continuation of International Application No. PCT/CN2011/080507, filed on Sep. 30, 2011, now pending, the contents of which are herein wholly incorporated by reference.

TECHNICAL FIELD

The present invention relates to the field of communications, and in particular to a method for carrying out a multimedia broadcast multicast service, a home base station and user equipment.

BACKGROUND

3GPP studies the issue of ensuring the continuity of a multimedia broadcast multicast service (MBMS) when user equipment CUE) moves. Currently, a method addressing the above issue is that the user equipment provides some pieces of information of it on receiving an MBMS to a base station, and some pieces of information on the MBMS are interacted between base stations.

However, in the implementation of the present invention, the inventors found that in a long-term evolution advanced (LTE-A) system, a closed subscriber group (CSG) cell (controlled by a home base station (home evolved Node B, HeNB)) is incapable of providing an MBMS; and when user equipment receiving an MBMS is handed over from a macro cell to a CSG cell, the service will be interrupted, or user equipment in the CSG cell needing to receive an MBMS or starting to receive an MBMS cannot receive an MBMS. There exists no effective way to solve the above problem.

It should be noted that the above description of the background is merely provided for clear and complete explanation of the present invention and for easy understanding by those skilled in the art. And it should not be understood that the above technical solution is known to those skilled in the art as it is described in the background of the present invention.

SUMMARY

An object of the embodiments of the present invention is to provide a method for carrying out a multimedia broadcast multicast service, a home base station and user equipment; user equipment of a CSG cell or user equipment handed over to the CSG is enabled to receive an MBMS of a macro cell by configuring a subframe of the CSG cell at a position corresponding to that of the MBSFN subframe of the macro cell into an ABS or into an ABS and MBSFN subframe, thereby ensuring the continuity of the MBMS.

According to one aspect of the embodiments of the present invention, there is provided a method for carrying out a multimedia broadcast multicast service, including:

acquiring, by a home network side entity, multimedia broadcast multicast service (MBMS) configuration information of a macro cell, the MBMS configuration information of the macro cell including first MBMS configuration information, the first MBMS configuration information including position information of a multimedia broadcast multicast single frequency network (MBSFN) subframe in the macro cell; and configuring a subframe of a closed subscriber group (CSG) cell at a position which is the same as that of the MBSFN subframe of the macro cell into a first almost blank subframe (ABS) or into a first ABS and MBSFN subframe, according to the acquired first MBMS configuration information, so that user equipment is capable of receiving the MBMS of the macro cell.

According to another aspect of the embodiments of the present invention, there is provided a method for carrying out a multimedia broadcast multicast service, including:

receiving, by user equipment of a CSG cell, a multimedia broadcast multicast service of a macro cell at a first ABS or a first ABS and MBSFN subframe configured by a home network side entity;

wherein the position of the first ABS or the first ABS and MBSFN subframe is the same as the position of an MBSFN subframe of the macro cell.

According to still another aspect of the embodiments of the present invention, there is provided a home network side entity, including:

an information acquiring unit configured to acquire MBMS configuration information of a macro cell, the MBMS configuration information of the macro cell including first MBMS configuration information, the first MBMS configuration information including position information of an MBSFN subframe in the macro cell; and a first subframe configuring unit configured to configure a subframe of a CSG cell at a position which is the same as that of the MBSFN subframe of the macro cell into an ABS or into a first ABS and MBSFN subframe according to the acquired first MBMS configuration information, so that UE is capable of receiving the MBMS of the macro cell.

According to further still another aspect of the embodiments of the present invention, there is provided user equipment, including:

a service receiving unit configured to receive a multimedia broadcast multicast service of a macro cell at a first ABS or a first ABS and MBSFN subframe configured by a home network side entity;

wherein the position of the first ABS or the first ABS and MBSFN subframe is the same as the position of an MBSFN subframe of the macro cell.

According to further still another aspect of the embodiments of the present invention, there is provided a computer-readable program, wherein when the program is executed in a home network side entity, the program enables a computer to carry out the method for carrying out a multimedia broadcast multicast service as described above in the home network side entity.

According to further still another aspect of the embodiments of the present invention, there is provided a storage medium in which a computer-readable program is stored, wherein the computer-readable program enables a computer to carry out the method for carrying out a multimedia broadcast multicast service as described above in a home network side entity.

According to further still another aspect of the embodiments of the present invention, there is provided a computer-readable program, wherein when the program is executed in UE, the program enables a computer to carry out the method for carrying out a multimedia broadcast multicast service as described above in the UE.

According to further still another aspect of the embodiments of the present invention, there is provided a storage medium in which a computer-readable program is stored, wherein the computer-readable program enables a computer to carry out the method for carrying out a multimedia broadcast multicast service as described above in UE.

The advantage of the embodiments of the present invention resides in that user equipment of a CSG cell or user equipment handed over to the CSG is enabled to receive an MBMS of a macro cell by configuring a subframe of the CSG cell at a position corresponding to that of the MBSFN subframe of the macro cell into an ABS or into an ABS and MBSFN subframe, thereby ensuring the continuity of the MBMS.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including/comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the present invention will be apparent from the following detailed description in conjunction with the drawings, in which.

DETAILED DESCRIPTION

Various embodiments of the present invention shall be described below with reference to the accompanying drawings. These embodiments are illustrative only and are not intended to limit the present invention. For easy understanding of the principle and embodiments of the present invention by those skilled in the art, the method for carrying out a multimedia broadcast multicast service shall be described taking an LTE-A/LTE system as an example. However, it should be understood that the present invention is not limited to the above system, and is applicable to other systems relating to a multimedia broadcast multicast service in the above case. Currently, as a CSG cell is incapable of providing an MBMS, when user equipment receiving an MBMS is handed over from a macro cell to a CSG cell, the service will be interrupted, or user equipment in the CSG cell needing to receive an MBMS or starting to receive an MBMS cannot receive an MBMS. Following description is given to the problem existed in a current method for carrying out an MBMS taking user equipment handed over to a CSG cell as an example.

Figure 1:
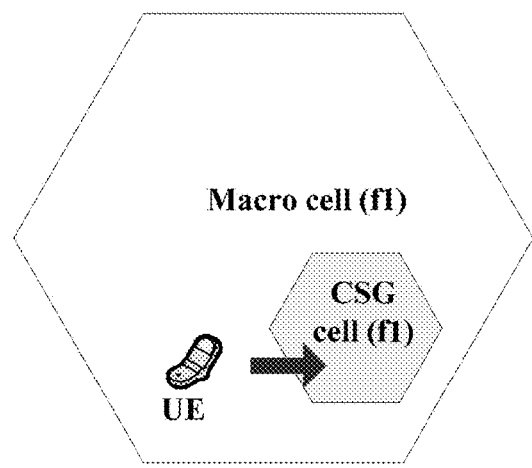
FIG. 1 is a schematic diagram of handing over user equipment from a macro cell to a CSG cell.

FIG. 1 is a schematic diagram of handing over user equipment receiving an MBMS from a macro cell to a CSG cell. In a long-term evolution advanced (LTE-A) system, a closed subscriber group (CSG) cell (controlled by a home base station (such as HeNB)) is incapable of providing an MBMS; and when user equipment receiving an MBMS is handed over from a macro cell to a CSG cell, the service will be interrupted.

Currently, a method for avoiding MBMS interruption is to transmit an MBMS to UE in a unicast manner after the UE is handed over to a CSG cell. The method will result in occurrence of time delay when the UE is receiving the MBMS on the one hand, as unicast data need a hybrid automatic repeat request (HARM) to guarantee accuracy of transmission; and on the other hand, when the number of pieces of UE is relatively large, the same MBMS shall be repeatedly transmitted for many times, thereby leading to reduction of spectrum efficiency of the system.

In the embodiments of the present invention, in order to solve the above problem and ensure that the UE can still receive an MBMS after entering into the CSG cell or UE of the CSG cell can receive an MBMS, following manner is used:

in the CSG cell, a home network entity, such as a base station (HeNB) or a network management system (OAM) of the base station, configures some subframes as almost blank sub-frames (ABSs) or ABS+MBSFN subframes, the positions of these subframes being the same as those of MBSFN subframes in a macro cell (controlled by a macro base station (macro evolved Node B, MeNB)). In this way, the UE may receive an MBMS of the MeNB at the configured ABS or ABS+MBSFN subframes.

Figure 2A:
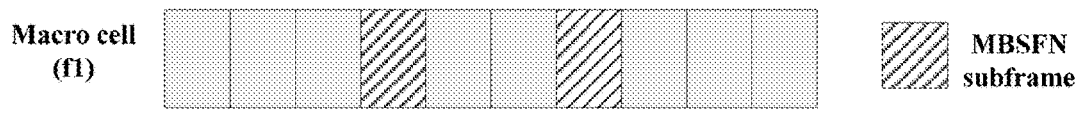
FIG. 2A is a schematic diagram of a position of an MBSFN subframe of the macro cell.
Figure 2B:
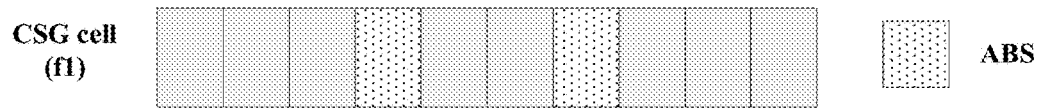
FIG. 2B is a schematic diagram of the CSG cell configured as an ABS subframe.
Figure 2C:
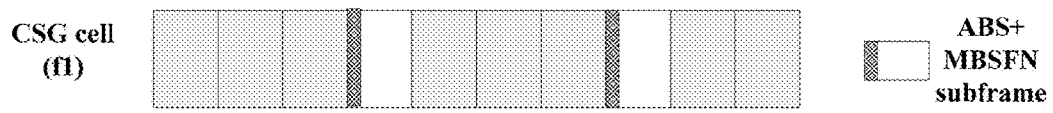
FIG. 2C is a schematic diagram of the CSG cell configured as an ABS+MBSFN subframe.

FIG. 2A is a schematic diagram of a position of an MBSFN subframe of the macro cell, FIG. 2B is a schematic diagram of the CSG cell configured as an ABS subframe, and FIG. 2C is a schematic diagram of the CSG cell configured as an ABS+MBSFN subframe.

For example, as shown in FIG. 1, the macro cell and the CSG cell operate at the same frequency f1. When the UE receiving an MBMS is moved from the macro cell to the CSG cell, the reception of the MBMS will be interrupted.

In order to solve this problem, a home network entity, such as a base station (HeNB) or a network management system (OAM) of the base station, may set some subframes as almost blank subframes (ABSs) or ABS+MBSFN subframes, the positions of these subframes being the positions of subframes transmitting MBMSs in a macro cell, that is, MBSFN subframes.

As shown in FIG. 2B, if the subframes are set as ABSs, the HeNB transmits a cell-specific reference signal (CRS) in the ABSs only. And as shown in FIG. 2C, if the subframes are set as ABS+MBSFN subframes, the HeNB transmits a CRS in a non-MBSFN area (the shadowed part) only. Therefore, the user equipment may receive an MBMS of the MeNB and is only interfered by a CRS in the CSG cell.

The method for carrying out a multimedia broadcast multicast service of embodiments of the present invention shall be described in detail below with reference to the drawings.

Figure 3:
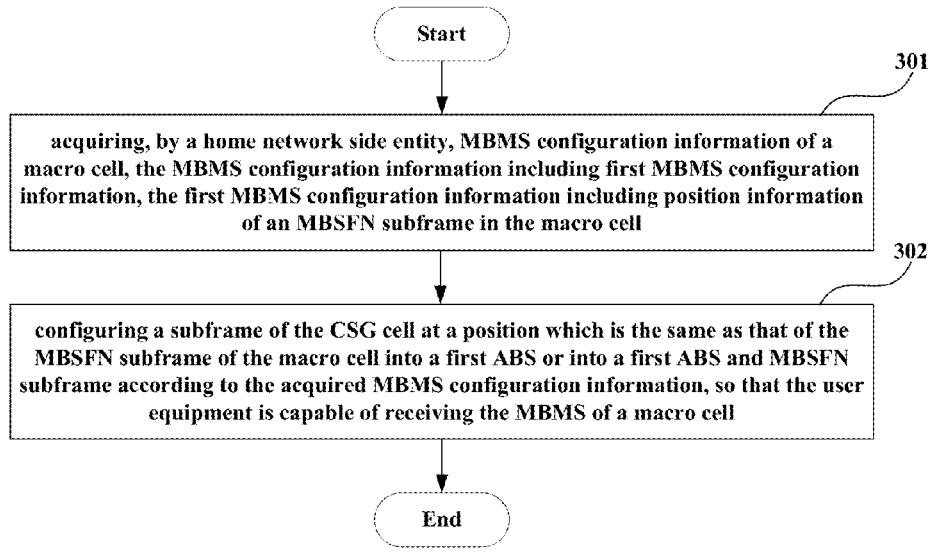
FIG. 3 is a flowchart of the method for carrying out a multimedia broadcast multicast service of Embodiment 1 of the present invention.
Figure 13:
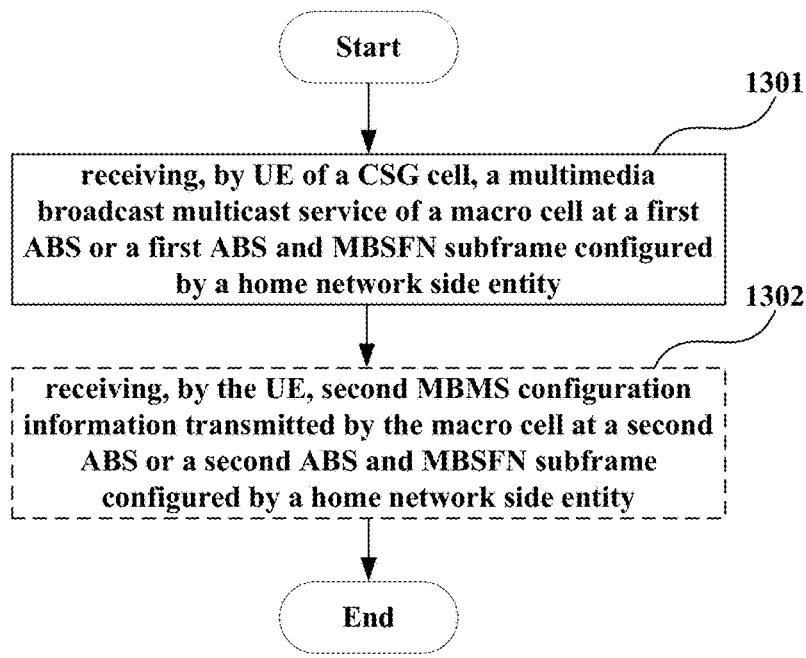
FIG. 13 is a flowchart of the method for carrying out a multimedia broadcast multicast service of Embodiment 11 of the present invention.

FIG. 3 is a flowchart of the method for carrying out a multimedia broadcast multicast service of Embodiment 1 of the present invention. As shown in FIG. 13, the method includes:

step 301: acquiring, by the home network side entity, MBMS configuration information of a macro cell, the MBMS configuration information of the macro cell including first MBMS configuration information, the first MBMS configuration information including position information of a multimedia broadcast multicast single frequency network (MBSFN) subframe in the macro cell;

in this embodiment, the home network side entity may be a network management system (OAM) of an HeNB, or may be an HeNB; wherein, when direct communication between the MeNB controlling the macro cell and the HeNB controlling the CSG cell cannot be performed, MBMS configuration information may be obtained from the MeNB via the OAM of the HeNB, and the above subframes may be configured according to the configuration information;

furthermore, the HeNB may obtain the MBMS configuration information of the macro cell from the macro cell or the user equipment of the HeNB via signaling of an S1 interface or signaling of an X2 interface, and configure the above subframes according to the configuration information;

step 302: configuring a subframe of the CSG cell at a position which is the same as that of the MBSFN subframe of the macro cell into a first almost blank subframe (ABS) or into a first ABS and MBSFN subframe by the home network side entity according to the acquired MBMS configuration information, so that the user equipment is capable of receiving the MBMS of a macro cell;

in this embodiment, the position of the configured first ABS or the first (ABS and MBSFN subframe) is as shown in FIGS. 2A-2C; wherein, each ABS or each (ABS+MBSFN subframe) occupies a subframe;

in configuring one subframe into an ABS, a CRS exists in the whole ABS; and in configuring one subframe into an (ABS+MBMS subframe), a CRS is only contained in a control domain of the subframe;

in this way, the UE may receive an MBMS of the macro cell in the configured first ABS or the first ABS and MBSFN subframe, thereby avoiding interruption of the MBMS when eh UE is handed over from the macro cell to the CSG cell, and making the UE of the CSG cell receive the MBMS.

In this embodiment, besides the first MBMS configuration information, the MBMS configuration information obtained by the home network side entity further includes second MBMS configuration information, the second MBMS configuration information including one or more pieces of the following information:

MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging.

In the above second MBMS configuration information, the MBMS control channel configuration change indication information is used to indicate whether control information of the MBMS changes.

The MBMS control channel configuration information is used to indicate configuration of an MBMS control channel, such as area ID of an MBSFN to which a control channel corresponds, a position where the control channel is present, a modulation and coding scheme used by the control channel, and a cycle of change of the control channel, etc.

The MBSFN region configuration information transmitted on the MBMS control channel containing relevant information of a physical broadcast multicast channel for MBMS data receiving is used to indicate a position of a subframe for transmitting MBMS data, and a modulation and coding scheme used in transmitting MBMS data, etc.

The scheduling information of relevant system information indicates a position for transmission of system information when some pieces of the above MBMS configuration information contained in the system information is transmitted. For example, in this embodiment, the scheduling information of relevant system information may be scheduling information of relevant system information of the LTE system.

The information about paging is used to indicate whether the system information changes.

In this way, in receiving the MBMS data by the UE, if the relevant information of the control channel changes, the UE may further obtain corresponding information, so as to further ensure the integrity of the received data in case of making the reception of the MBMS data uninterrupted.

The method for carrying out a multimedia broadcast multicast service of embodiments of the present invention shall be described in detail below with reference to the drawings. Description is given with reference to FIG. 4-6 taking that an OAM of an HeNB configures a subframe as example, and description is given with reference to FIG. 7-12 taking that an HeNB configures a subframe as example.

Figure 4:
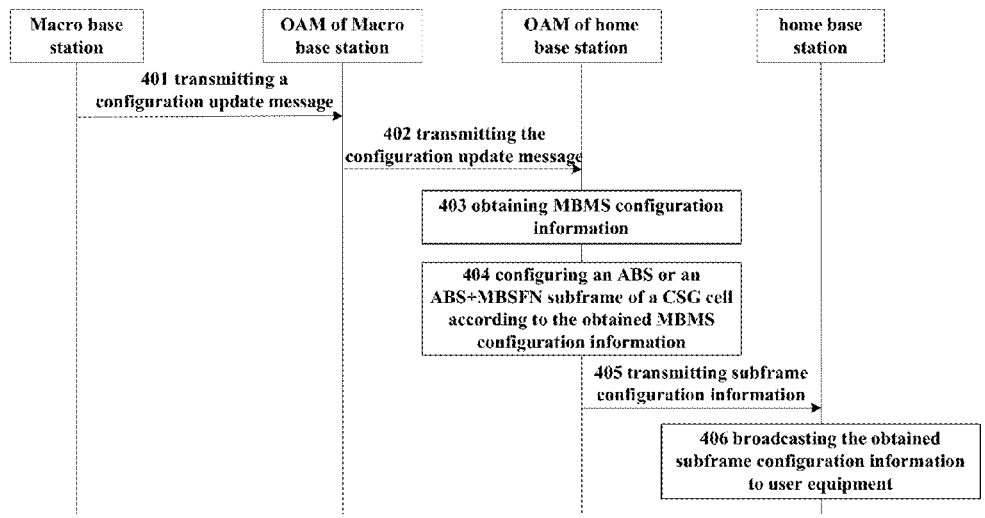
FIG. 4 is a flowchart of the method for carrying out a multimedia broadcast multicast service of Embodiment 2 of the present invention.

FIG. 4 is a flowchart of the method for carrying out a multimedia broadcast multicast service of Embodiment 2 of the present invention. In this embodiment, MBMS configuration information of the macro cell is acquired by an OAM of an HeNB by receiving a configuration update message containing MBMS configuration information transmitted by an MeNB via an OAM of the MeNB. The detailed scheme is as follows:

step 401: transmitting a configuration update message by the MeNB to the OAM of the macro cell, the configuration update message including updated MBMS configuration information;

in this embodiment, when the MBMS configuration of the macro cell changes, the MeNB transmits the updated MBMS configuration information to the OAM entity of the MeNB;

wherein, the MeNB may transmit the updated MBMS configuration information to the OAM of the MeNB via an MBMS configuration update message; however, it is not limited thereto, and the MBMS configuration information may also be transmitted via other messages;

in this embodiment, the configuration information may include first MBMS configuration information, the first MBMS configuration information including position information of a multimedia broadcast multicast single frequency network (MBSFN) subframe in the macro cell;

second MBMS configuration information may further be included, the second MBMS configuration information including one or more pieces of the following information:

MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging, with the functions of these pieces of information being as described above, and the second MBMS configuration information being optional.

step 402: transmitting the configuration update message by the OAM of the MeNB to the OAM of the HeNB;

wherein, the OAM of the MeNB transmits the configuration update message to the OAM of the HeNB via transmission of a core network;

step 403: receiving the configuration update message by the OAM of the HeNB, thereby obtaining MBMS configuration information in the configuration update message by the OAM of the HeNB;

wherein, if the MBMS configuration information transmitted by the MeNB includes the first MBMS configuration information, i.e. position information of a multimedia broadcast multicast single frequency network (MBSFN) subframe in the macro cell, the OAM of the HeNB may obtain the position information of a multimedia broadcast multicast single frequency network (MBSFN) subframe in the macro cell in the MBMS configuration information;

and if the MBMS configuration information transmitted by the MeNB includes the second MBMS configuration information, the OAM of the HeNB may further obtain the second MBMS configuration information;

step 404: configuring a first ABS or first ABS+MBSFN subframe of a CSG cell by the OAM system of the HeNB according to position information in the first MBMS configuration information in the MBMS configuration information, so that the position of the first ABS or first ABS+MBSFN subframe corresponds to the position of an MBSFN subframe in the macro cell, as shown in FIGS. 2A-2C; in this way, UE of the CSG cell may receive the MBMS in the above configured subframe;

and if the MBMS configuration information further includes the second MBMS configuration information, the OAM of the HeNB may further configure a second ABS or second ABS+MBSFN subframe of the CSG cell, so that the position of the second ABS or second ABS+MBSFN subframe corresponds to the position of a subframe position of the second MBMS configuration information, and the user equipment can receive the second MBMS configuration information from the macro cell in the above configured subframe;

step 405: transmitting, by the OAM of the HeNB, information of the configured ABS or ABS+MBSFN subframe to the HeNB, so that the HeNB learns subframe configuration information, i.e. the position of the ABS or ABS+MBSFN subframe;

wherein, if the first subframe configuration information, i.e. the first ABS or first ABS+MBSFN subframe, is only configured in step 404, the first subframe configuration information is transmitted to the HeNB, and the HeNB transmits the first subframe configuration information to the user equipment;

if the second subframe configuration information is further configured in step 404, the second subframe configuration information is transmitted to the HeNB, and the HeNB transmits the second subframe configuration information to the user equipment;

the OAM of the HeNB may transmit the information via a subframe configuration message; however, it is not limited thereto, and other messages may be used for transmission;

step 406: broadcasting the configured subframe configuration information by the HeNB to the user equipment of the HeNB;

in this way, the user equipment of the HeNB may obtain the first subframe configuration information, or the first subframe configuration information and the second subframe configuration information, and the UE may receive an MBMS transmitted by the macro cell in the configured ABS or ABS+MBSFN subframe after the UE is handed over to the CSG cell or when the UE of the CSG cell receives the MBMS, thereby ensuring that the MBMS is not interrupted after the UE is handed over to the CSG cell, or ensuring that the UE of the CSG cell receives the MBMS of the macro cell.

In this embodiment, step 406 is optional, and the information may be broadcasted, or not broadcasted.

Figure 5:
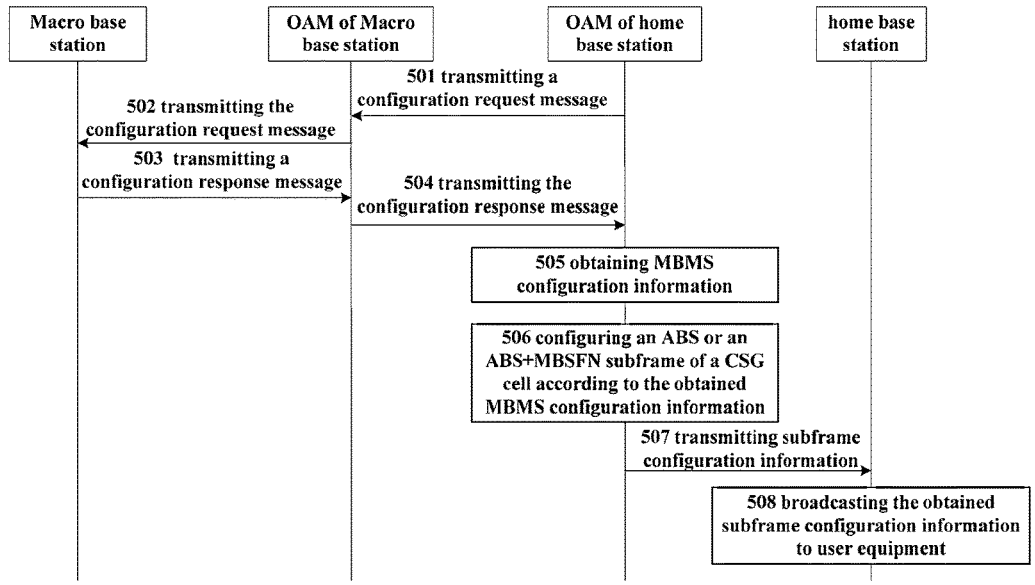
FIG. 5 is a flowchart of the method for carrying out a multimedia broadcast multicast service of Embodiment 3 of the present invention.

FIG. 5 is a flowchart of the method for carrying out a multimedia broadcast multicast service of Embodiment 3 of the present invention. In this embodiment, the OAM of the HeNB requests MBMS configuration information from an MeNB. The detailed scheme is as follows:

steps 501 and 502: transmitting a configuration request message by the OAM of the HeNB to the MeNB, requesting MBMS configuration information of the MeNB;

in this embodiment, the configuration request message includes MBMS configuration information, the MBMS configuration information including information as described in step 401 of Embodiment 2, which shall not be described herein any further;

in this embodiment, the OAM of the HeNB may transmit the configuration request message first to the OAM of the MeNB in a core network, and then the OAM system of the MeNB transmits the configuration request message to the MeNB;

steps 503 and 504: after the MeNB obtains the configuration request message, transmitting, by the MeNB, the MBMS configuration information of the MeNB to the OAM of the MeNB via the core network, then feeding back, by the OAM of the MeNB, the MBMS configuration information of the MeNB to the OAM of the HeNB;

wherein, the MBMS configuration information may be contained in a configuration response message for transmitting to the OAM of the HeNB; however, it is not limited thereto, and other messages may be used for transmission;

in this embodiment, the processes of steps 505-508 are similar to those of steps 403-406 in Embodiment 2, which shall not be described herein any further.

Figure 6:
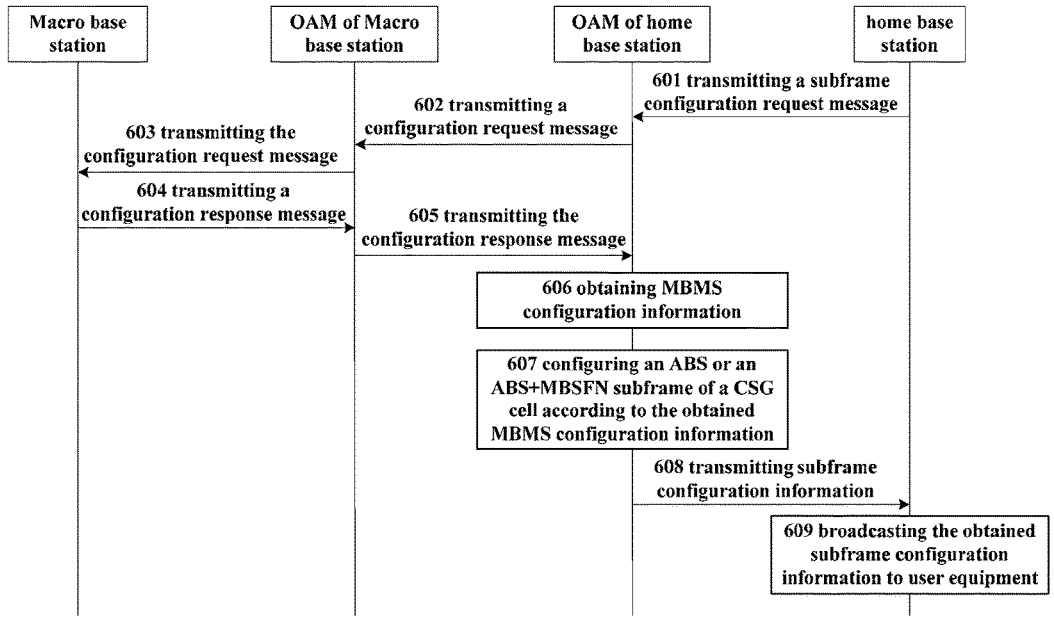
FIG. 6 is a flowchart of the method for carrying out a multimedia broadcast multicast service of Embodiment 4 of the present invention.

FIG. 6 is a flowchart of the method for carrying out a multimedia broadcast multicast service of Embodiment 4 of the present invention. In this embodiment, an HeNB requests MBMS configuration information from an MeNB. The detailed scheme is as follows:

step 601: transmitting a subframe configuration request message by the HeNB to its OAM for requesting for obtaining MBMS configuration information of a macro cell;

step 602: transmitting a configuration request message by the OAM of the HeNB to the OAM of the MeNB via the core network according to the subframe configuration request message;

wherein, the configuration request message may contain the same content as that of the subframe configuration request message, and the configuration request message is similar to that described in embodiments 2 and 3, which shall not be described herein any further;

steps 603-609 are similar to steps 502-508 shown in FIG. 5, which shall not be described herein any further.

Figure 7:
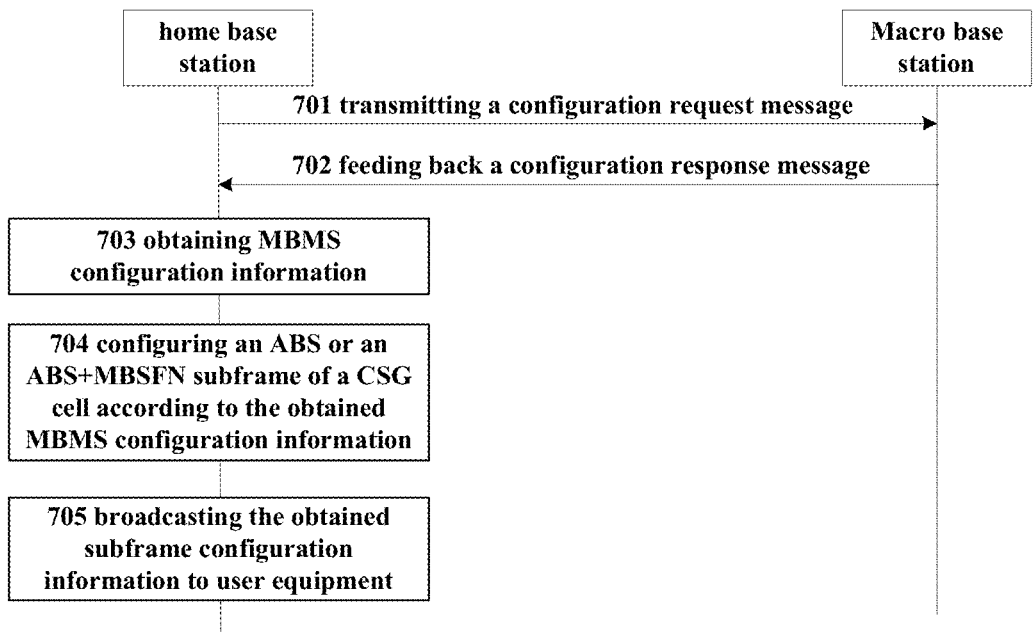
FIG. 7 is a flowchart of the method for carrying out a multimedia broadcast multicast service of Embodiment 5 of the present invention.

FIG. 7 is a flowchart of the method for carrying out a multimedia broadcast multicast service of Embodiment 5 of the present invention. In this embodiment, an HeNB requests MBMS configuration information from an MeNB. The detailed scheme is as follows:

step 701: transmitting directly the configuration request message by the HeNB to the MeNB for requesting for obtaining MBMS configuration information of a macro cell;

wherein, the request message may be communicated via an X2 interface between the MeNB and the HeNB;

step 702: obtaining by the MeNB its MBMS configuration information after receiving the configuration request message, and feeding back the configuration request message to the HeNB;

wherein, the MBMS configuration information may be transmitted in a configuration response message; however, it is not limited thereto, and the MBMS configuration information may be transmitted via other messages;

in this embodiment, the configuration information may include first MBMS configuration information, the first MBMS configuration information including position information of a multimedia broadcast multicast single frequency network (MBSFN) subframe in the macro cell;

second MBMS configuration information may further be included, the second MBMS configuration information including one or more pieces of the following information: MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging, with the functions of these pieces of information being as described above, and the second MBMS configuration information being optional;

step 703: obtaining MBMS configuration information in the response message by the HeNB;

wherein, if the MBMS configuration information transmitted by the MeNB includes the first MBMS configuration information, i.e. position information of a multimedia broadcast multicast single frequency network (MBSFN) subframe in the macro cell, the HeNB may obtain the position information of a multimedia broadcast multicast single frequency network (MBSFN) subframe in the macro cell in the MBMS configuration information;

and if the MBMS configuration information transmitted by the MeNB includes the second MBMS configuration information, the HeNB may further obtain the second MBMS configuration information;

step 704: configuring a first ABS or a first ABS+MBSFN subframe of the CSG cell by the HeNB according to the position information in the first MBMS configuration information, so that the position of the first ABS or first ABS+MBSFN subframe corresponds to the position of an MBSFN subframe in the macro cell, as shown in FIGS. 2A-2C;

step 705: broadcasting the configured subframe configuration information by the HeNB to the user equipment of the HeNB;

in this way, the user equipment of the HeNB may obtain the subframe configuration information and may receive an MBMS transmitted by the macro cell in the configured first ABS or the configured first ABS+MBSFN subframe after the UE is handed over to the CSG cell or when the UE of the CSG cell receives the MBMS, thereby ensuring that the MBMS is not interrupted after the UE is handed over to the CSG cell, or ensuring that the UE of the CSG cell receives the MBMS transmitted by the macro cell;

furthermore, in step 705, the second MBMS configuration information may be broadcasted by the HeNB to the UE after the HeNB obtains the second MBMS configuration information in the case where the MeNB transmits further the second MBMS configuration information, and this step is optional.

Figure 8:
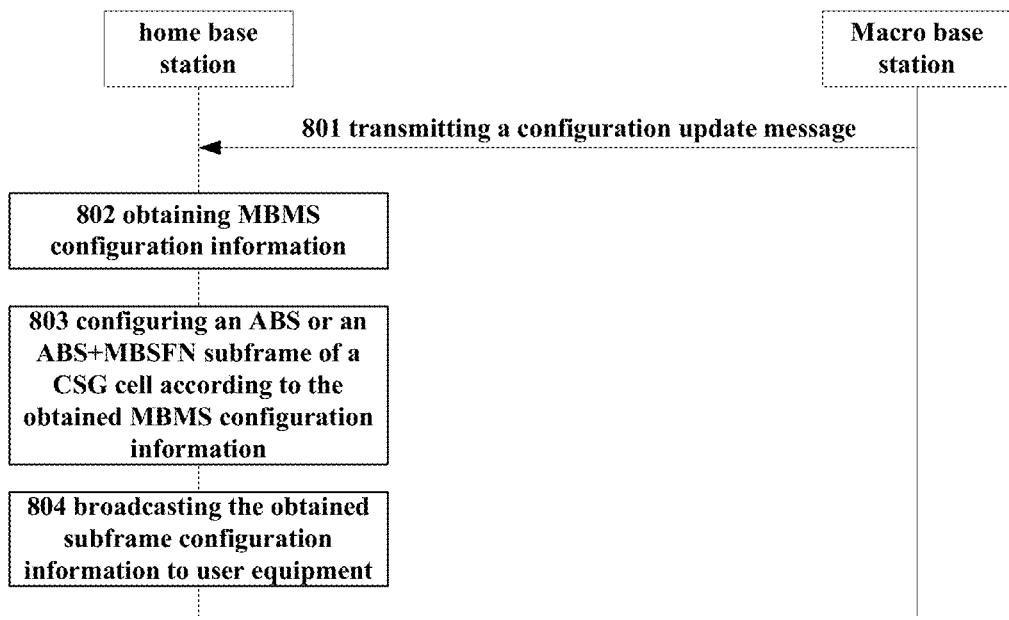
FIG. 8 is a flowchart of the method for carrying out a multimedia broadcast multicast service of Embodiment 6 of the present invention.

FIG. 8 is a flowchart of the method for carrying out a multimedia broadcast multicast service of Embodiment 6 of the present invention. In this embodiment, an MeNB transmits directly updated MBMS configuration information to an HeNB. The detailed scheme is as follows:

step 801: transmitting a configuration update message by the MeNB to the HeNB, the configuration update message including updated MBMS configuration information;

in this embodiment, when the MBMS configuration of the MeNB changes, the MeNB transmits the updated MBMS configuration information to the HeNB; and similar to Embodiment 5, the MeNB may communicate with the HeNB via an X2 interface;

in this embodiment, the configuration information may include first MBMS configuration information, the first MBMS configuration information including position information of a multimedia broadcast multicast single frequency network (MBSFN) subframe in the macro cell;

in addition, the configuration information may further include second MBMS configuration information, the second MBMS configuration information including one or more pieces of the following information: MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging, with the functions of these pieces of information being as described above, and the second MBMS configuration information being optional;

step 802: obtaining MBMS configuration information in the configuration update message;

steps 803-804 are similar to steps 704-705 in Embodiment 5, which shall not be described herein any further.

Figure 9:
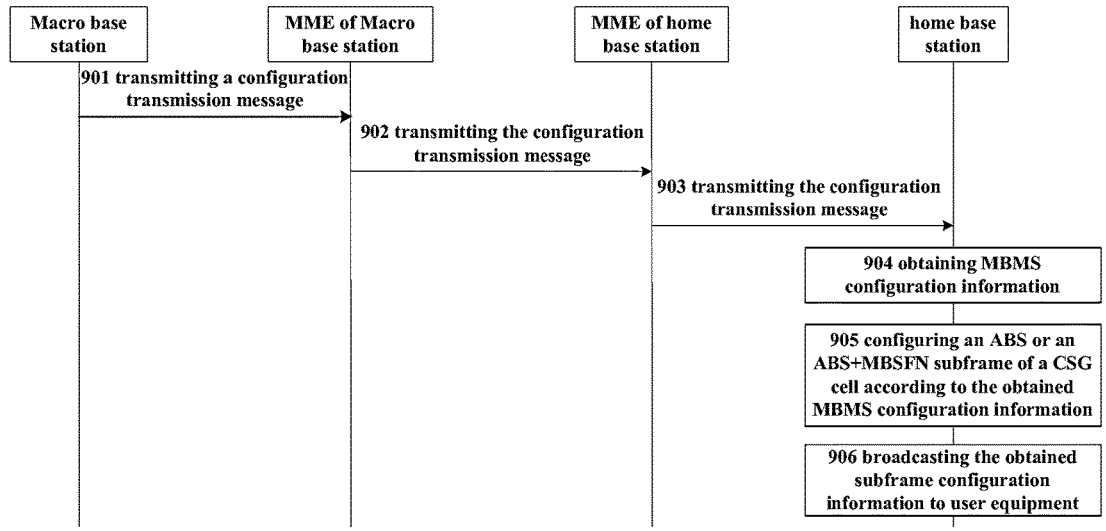
FIG. 9 is a flowchart of the method for carrying out a multimedia broadcast multicast service of Embodiment 7 of the present invention.

FIG. 9 is a flowchart of the method for carrying out a multimedia broadcast multicast service of Embodiment 7 of the present invention. In this embodiment, an MeNB transmits a configuration update message containing MBMS configuration information to an HeNB via its mobility management entity (MME). The detailed scheme is as follows:

step 901: transmitting updated MBMS configuration information by the MeNB to the MME of the MeNB;

in this embodiment, when the MBMS configuration of a micro cell changes, the MeNB transmits the updated MBMS configuration information to the MME of the MeNB; wherein, the MeNB communicates with its MME via S1 interface signaling;

in this embodiment, the MeNB may transmit the MBMS configuration information via a configuration transmission message; wherein the configuration transmission message includes a configuration update message, the configuration update message including updated MBMS configuration information; however, it is not limited thereto, and the MBMS configuration information may be transmitted via other messages;

in this embodiment, the configuration information may include first MBMS configuration information, i.e. position information of a multimedia broadcast multicast single frequency network (MBSFN) subframe in the macro cell;

in addition, the configuration information may further include second MBMS configuration information, the second MBMS configuration information including one or more pieces of the following information: MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging;

step 902: transmitting the configuration transmission message by the MME of the MeNB to the MME of the HeNB;

step 903: transmitting the configuration transmission message by the MME of the HeNB to the HeNB;

step 904: obtaining MBMS configuration information in the configuration transmission message by the HeNB after receiving the configuration transmission message;

wherein, if the MBMS configuration information transmitted by the MeNB includes the first MBMS configuration information, i.e. position information of a multimedia broadcast multicast single frequency network (MBSFN) subframe in the macro cell, the HeNB may obtain the position information of a multimedia broadcast multicast single frequency network (MBSFN) subframe in the macro cell in the MBMS configuration information;

and if the MBMS configuration information transmitted by the MeNB includes the second MBMS configuration information, the HeNB may further obtain the second MBMS configuration information;

step 905: configuring an ABS or an ABS+MBSFN subframe of the CSG cell by the HeNB according to the position information in the MBMS configuration information after obtaining the first MBMS configuration information, so that the position of the ABS or the ABS+MBSFN subframe corresponds to the position of an MBSFN subframe in the macro cell, as shown in FIGS. 2A-2C;

step 906: broadcasting information of the configured ABS or ABS+MBSFN subframe by the HeNB to the user equipment of the HeNB;

in this way, the user equipment of the HeNB may obtain the subframe configuration information, and an MBMS transmitted by the macro cell may be received by the UE in the configured ABS or ABS+MBSFN subframe after the UE is handed over to the CSG cell or when the UE of the CSG cell receives the MBMS, thereby ensuring that the MBMS is not interrupted after the UE is handed over to the CSG cell, and ensuring that the UE of the CSG cell receives the MBMS transmitted by the macro cell;

furthermore, in step 906, the second MBMS configuration information may be broadcasted to the UE after the HeNB obtains the second MBMS configuration information in the case where the MeNB transmits further the second MBMS configuration information, and this step is optional.

Figure 10:
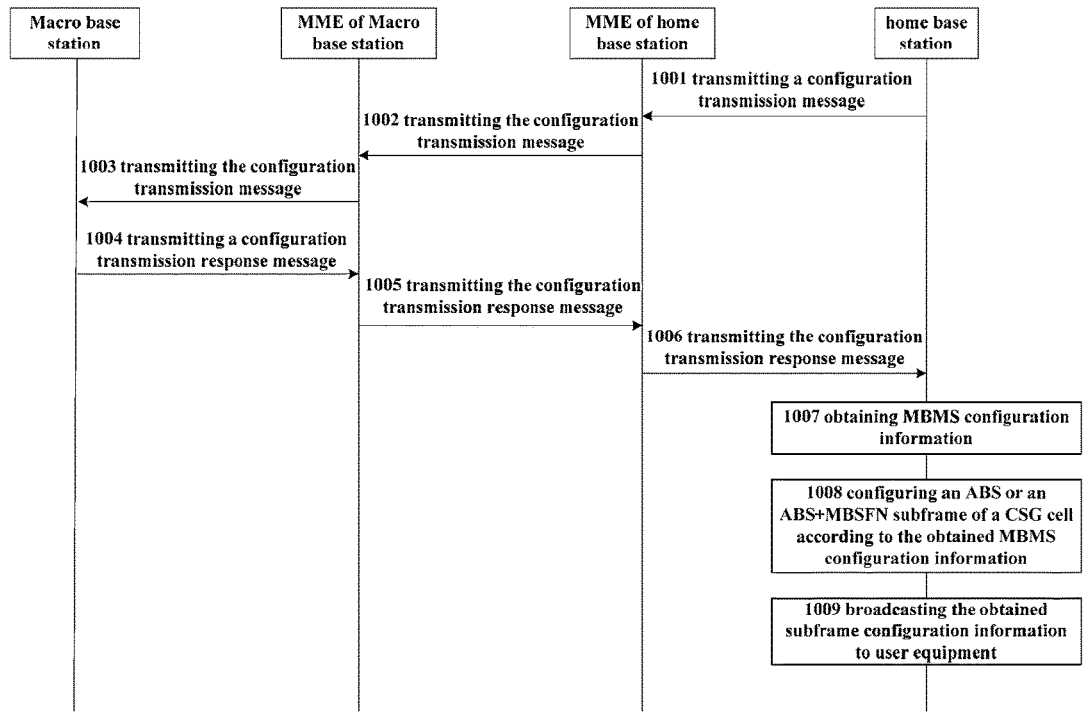
FIG. 10 is a flowchart of the method for carrying out a multimedia broadcast multicast service of Embodiment 8 of the present invention.

FIG. 10 is a flowchart of the method for carrying out a multimedia broadcast multicast service of Embodiment 8 of the present invention. In this embodiment, an HeNB requests an MBMS configuration information from an MeNB via its MME. The detailed scheme is as follows:

steps 1001-1003: transmitting the configuration transmission message by the HeNB to the MeNB via the MME of the HeNB and the MME of the MeNB in turn, requesting for obtaining the MBMS configuration information of the MeNB;

in this embodiment, the configuration transmission message is as described in Embodiment 7, which shall not be described herein any further;

steps 1004-1006: feeding back the MBMS configuration information of the MeNB by the MeNB to the MME of the HeNB via the MME of the MeNB after obtaining the configuration transmission message, and finally transmitting to the HeNB via the MME of the HeNB;

wherein, the MBMS configuration information may be contained in a configuration transmission response message for transmission to the MME of the MeNB, the MME of the HeNB and the HeNB in turn; however, it is not limited to the above message;

in this embodiment, the processes of steps 1007-1009 are similar to those of steps 904-906 in Embodiment 7, which shall not be described herein any further.

Figure 11:
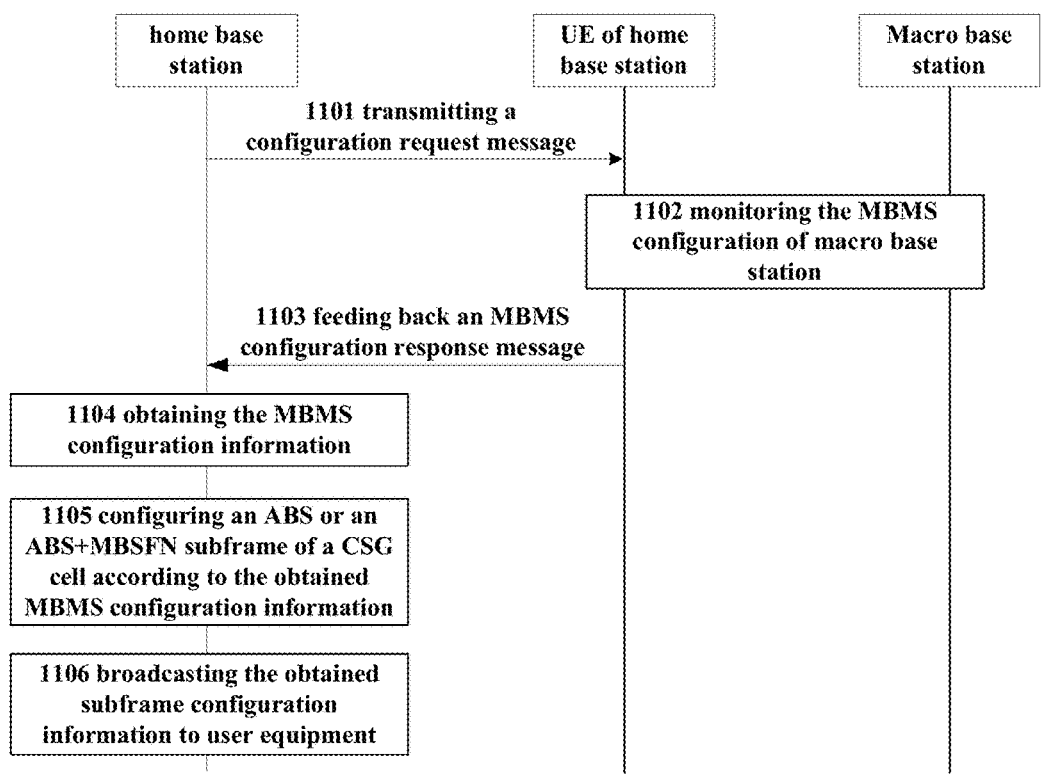
FIG. 11 is a flowchart of the method for carrying out a multimedia broadcast multicast service of Embodiment 9 of the present invention.

FIG. 11 is a flowchart of the method for carrying out a multimedia broadcast multicast service of Embodiment 9 of the present invention. In this embodiment, an HeNB requests MBMS configuration information of an MeNB from UE of the HeNB. The detailed scheme is as follows:

step 1101: transmitting a request message for acquiring MBMS configuration information by the HeNB to the UE of the HeNB;

wherein, the request message may be a configuration request message; however, it is not limited thereto, and any other message may be used for transmission;

step 1102: monitoring the MBMS configuration message of the MeNB by receiving relevant information by the UE of the HeNB after obtaining the request message;

wherein, the process of monitoring may be any one of the prior art, which shall not be described herein any further;

step 1103: transmitting the monitored MBMS configuration information by the UE of the HeNB to the HeNB;

wherein, it may be transmitted via a configuration response message;

in this embodiment, the processes of steps 1104-1106 are similar to those of steps 904-906 in Embodiment 7, which shall not be described herein any further.

Figure 12:
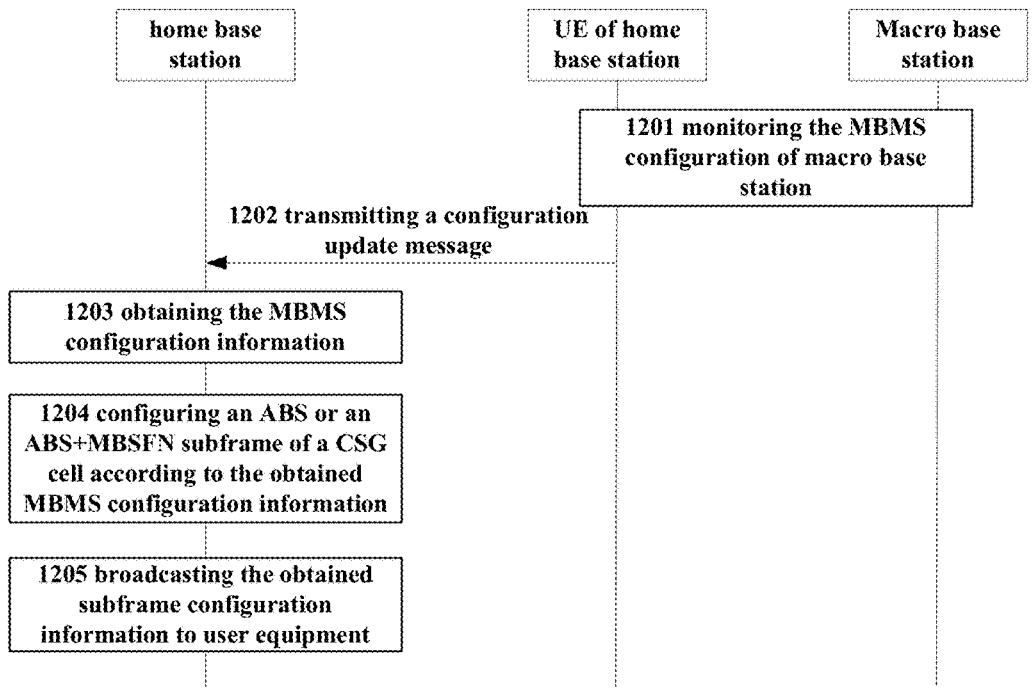
FIG. 12 is a flowchart of the method for carrying out a multimedia broadcast multicast service of Embodiment 10 of the present invention.

FIG. 12 is a flowchart of the method for carrying out a multimedia broadcast multicast service of Embodiment 10 of the present invention. In this embodiment, UE of an HeNB transmits the monitored MBMS configuration information of an MeNB to the HeNB. The detailed scheme is as follows:

step 1201: monitoring the MBMS configuration information of the MeNB by the UE of the HeNB;

step 1202: transmitting imitatively a configuration update message by the UE to the HeNB after the UE finds that the MBMS configuration information of the MeNB changes;

in this embodiment, the processes of steps 1203-1205 are similar to those of steps 904-906 in Embodiment 7, which shall not be described herein any further.

In the embodiments shown in FIGS. 4-12, following optional step (not shown) may also be included: for example, in steps 401, 402 and 405, transmitting a request message by a transmitting end to a receiving end, and transmitting a corresponding response message by the receiving end to notify whether the message transmitted by the transmitting end is correctly received. Other embodiments are similar, which shall not be described herein any further.

FIG. 13 is a flowchart of the method for carrying out a multimedia broadcast multicast service of Embodiment 11 of the present invention. As shown in FIG. 13, the method includes:

step 1301: receiving, by UE of a CSG cell, a multimedia broadcast multicast service of a macro cell at a first ABS or a first ABS and MBSFN subframe configured by a home network side entity;

wherein the position of the first ABS or the first ABS and MBSFN subframe is the same as the position of an MBSFN subframe of the macro cell, the home network side entity may be an OAM of an HeNB or an HeNB, as described in embodiments 1-10, thereby ensuring that the UE of the CSG receives the MBMS, or ensuring the MBMS of the UE handed over to the CSG cell is not interrupted by using the first ABS or the first ABS and MBSFN subframe;

step 1302: receiving, by the UE, second MBMS configuration information transmitted by the macro cell at a second ABS or a second ABS and MBSFN subframe configured by a home network side entity;

wherein, the second ABS or second ABS and MBSFN subframe is configured by the OAM of the HeNB, as described in Embodiment 2; and the position of the second ABS or the second ABS+MBSFN subframe being the same as the position of the subframe of the macro cell for transmitting the second MBMS configuration information;

wherein, the second MBMS configuration information includes one or more pieces of the following information:

MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging.

With step 1302, the UE may receive the second MBMS configuration information directly from the macro cell via the configured second ABS or second ABS and MBSFN subframe, so that the UE can proceed with receiving the MBMS in a case where the configuration information changes.

In the above embodiment, step 1302 is optional. Furthermore, the OAM may notify the configured second ABS or second ABS and MBSFN subframe to the HeNB, and then notifies the UE via the HeNB.

Furthermore, step 1302 may be replaced as: receiving by the UE the second MBMS configuration information broadcasted by an HeNB In this embodiment, the method may further include: receiving, by the UE, first subframe configuration information transmitted by the HeNB, the first subframe configuration information including information of the first ABS or the first (ABS+MBSFN subframe) configured by the home network side entity on the CSG cell according to the acquired MBMS configuration information of the macro cell; wherein the MBMS configuration information of the macro cell includes first MBMS configuration information, the first MBMS configuration information including position information of an MBSFN subframe in the macro cell; wherein, this step is optional.

In this embodiment, the method may further include: receiving, by the UE, second subframe configuration information transmitted by the HeNB, the second subframe configuration information including position information of the second ABS or the second ABS and MBSFN subframe configured by the home network side entity on the CSG cell according to the acquired second MBMS configuration information of the macro cell; wherein, the second subframe configuration information may be transmitted to the HeNB after being configured by the HeNB or the OAM of the HeNB, and is transmitted by the HeNB to the UE.

In this embodiment, the UE of the HeNB may further monitor a change of the MBMS configuration information of the MeNB, and transmit updated MBMS configuration information to the HeNB when the MBMS configuration information changes, so that the HeNB performs subframe configuration after obtaining the MBMS configuration information. In such a case, the method further includes:

monitoring, by the UE, updating of MBMS configuration information in the macro cell; and transmitting the updated MBMS configuration information of the macro cell to the HeNB (details are as described in steps 1201 and 1202 shown in FIG. 12, which shall not be described herein any further).

Furthermore, the UE of the HeNB may monitor the MBMS configuration information of the MeNB according to a request of the HeNB, and transmits the monitored MBMS configuration information to the HeNB. In such a case, the method may further include:

receiving, by the UE, a requesting message for acquiring the MBMS configuration information of the macro cell transmitted by the HeNB; monitoring the MBMS configuration information of the macro cell according to the requesting message; and transmitting the monitored MBMS configuration information to the HeNB (details are as described in steps 1101-1103 shown in FIG. 11, which shall not be described herein any further).

It can be seen from the above embodiment that the HeNB of the CSG or the OAM of the HeNB may acquire the first MBMS configuration information containing the MBMS subframe position of the macro cell, and may perform configuration of the first ABS or the first ABS+MBSFN subframe according to the first MBMS configuration information. In this way, the UE may receive the MBMS of the macro cell in the configured first ABS or first ABS+MBSFN subframe, thereby ensuring that the MBMS is not interrupted after the UE is handed over to the CSG cell, or ensuring that the UE of the CSG cell receives the MBMS of the macro cell.

Besides the first MBMS configuration information, the MBMS configuration information acquired by the HeNB of the CSG or the OAM of the HeNB may further include the second MBMS configuration information, as described above. In this way, when the UE receives the MBMS data, if relevant information of the control channel changes, the UE may further obtain the second MBMS configuration information, so as to further ensure the integrity of data reception in case of making the reception of the MBMS data uninterrupted.

Embodiments of the present invention further provide a home base station, a network management system of a home base station and UE, as described in embodiments 12, 13 and 14 below. As the principles of the home base station, the network management system of the home base station and the UE for solving problems are similar to those of the method for carrying out a multimedia broadcast multicast service based on an HeNB, an OAM of the HeNB and UE, the implementation of the method may be referred to for the implementation of the base station, network management system of the base station and the UE, and the repeated parts shall not be described any further.

Figure 14:
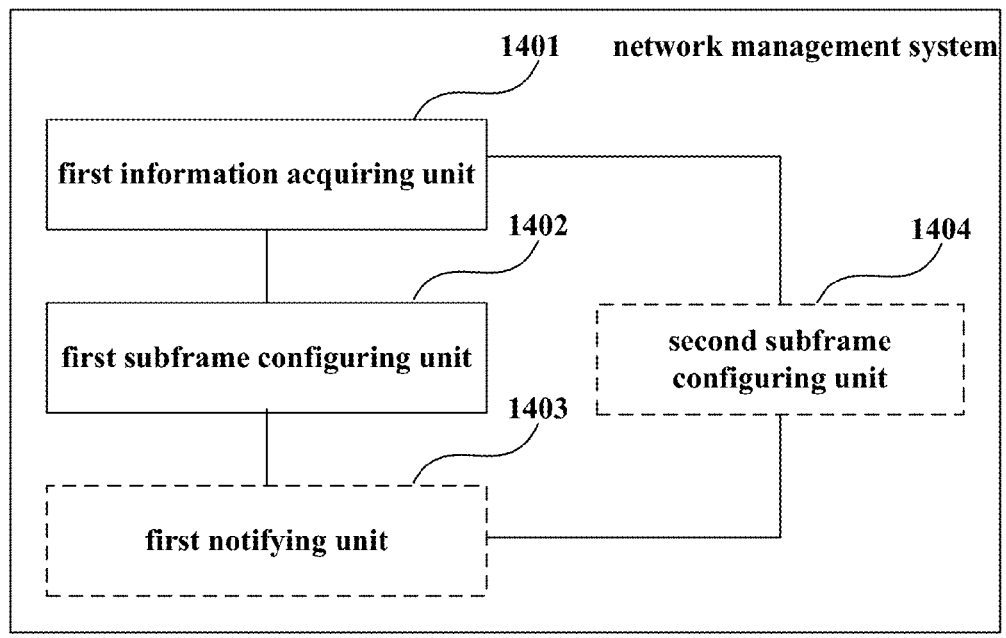
FIG. 14 is a schematic diagram of the structure of the network management system of a home base station of Embodiment 12 of the present invention.

FIG. 14 is a schematic diagram of the structure of the OAM of a home base station of Embodiment 12 of the present invention. As shown in FIG. 14, the network management system (OAM) includes: a first information acquiring unit 1401 and a first subframe configuring unit 1402; wherein, the first information acquiring unit 1401 is configured to acquire MBMS configuration information of a macro cell, the MBMS configuration information of the macro cell including first MBMS configuration information, the first MBMS configuration information including position information of an MBSFN subframe in the macro cell; and the first subframe configuring unit 1402 is configured to configure a subframe of a CSG cell at a position which is the same as that of the MBSFN subframe of the macro cell into a first ABS or into a first ABS and MBSFN subframe according to the acquired first MBMS configuration information, so that the UE is capable of receiving the MBMS of the macro cell at the configured first ABS or first (ABS+MBSFN) subframe.

In this embodiment, the MBMS configuration information may further include second MBMS configuration information, the second MBMS configuration information including one or more pieces of the following information: MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging.

In this embodiment, the network management system of the home base station, such as HeNB, may obtain MBMS configuration information of a macro cell from the macro cell, i.e. a macro base station, such as an MeNB.

In the embodiment of the present invention, as shown in FIG. 14, the network management system (OAM) of the HeNB may further include a first notifying unit 1403 configured to notify the first ABS or the first ABS and MBSFN subframe configured by the first subframe configuring unit 1402 to the HeNB, the first notifying unit 1403 being optional.

In this embodiment, when the MBMS configuration information includes the second MBMS configuration information, as shown in FIG. 14, the network management system may further include a second subframe configuring unit 1404;

wherein, the second subframe configuring unit 1404 is configured to configure a subframe of a CSG cell at a position which is the same as that of the position at which the macro cell transmits the second MBMS configuration information into a second ABS or into a second ABS and MBSFN subframe, according to the acquired second MBMS configuration information, so that the UE is capable of receiving the second MBMS configuration information from the macro cell at the configured the second ABS subframe or the second ABS+MBSFN subframe, the second subframe configuring unit 1404 being optional. In such a case, the subframe information configured by the second subframe configuring unit 1404 may also be notified to the home base station by the first notifying unit 1403, and may be notified to the UE by the home base station. In this embodiment, both of the first subframe configuration information and second subframe configuration information are notified to the home base station by the first notifying unit 1403; however, it is not limited thereto, and the first subframe configuration information and second subframe configuration information may be notified to the home base station by different notifying units.

In an embodiment, the first information acquiring unit 1401 is configured to receive a first configuration updating message containing the MBMS configuration information transmitted by the macro base station via the OAM of the macro base station. In this way, the first information acquiring unit 1401 may obtain the MBMS configuration information contained therein.

Figure 15:
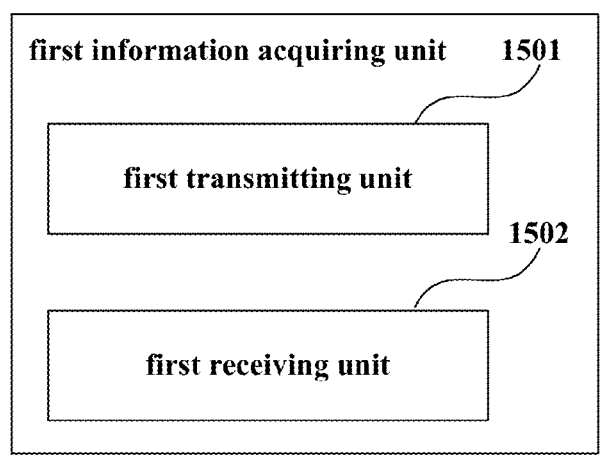
FIGS. 15 and 16 are schematic diagrams of the structure of the first information acquiring unit of Embodiment 12 of the present invention.

In another embodiment, FIG. 15 is a schematic diagram of the structure of the first information acquiring unit. As shown in FIG. 15, the first information acquiring unit 1401 includes: a first transmitting unit 1501 and a first receiving unit 1502; wherein, the first transmitting unit 1501 is configured to transmit a first requesting message for acquiring the MBMS configuration information to the OAM of the macro base station; and the first receiving unit 1502 is configured to receive a first response message containing the MBMS configuration information acquired from the MeNB and returned by the OAM of the macro base station according to the first requesting message. The detailed process is as described in Embodiment 3 shown in FIG. 5, which shall not be described herein any further.

Figure 16:
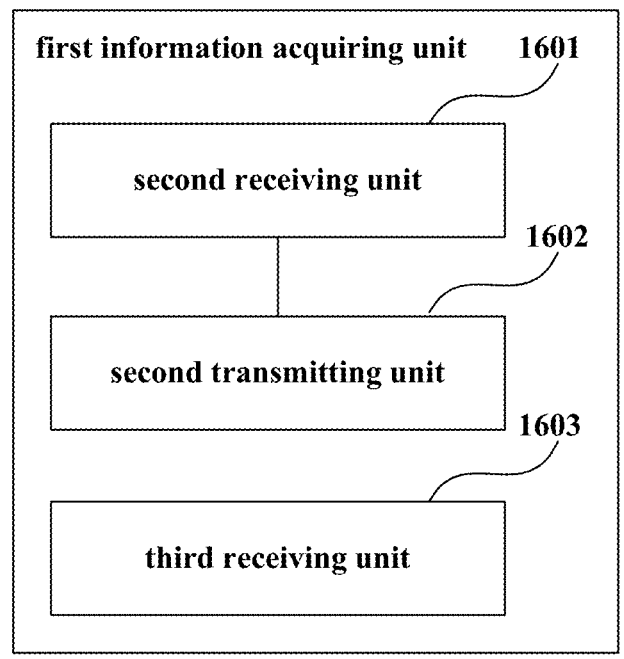

In another embodiment, FIG. 16 is a schematic diagram of the structure of the first information acquiring unit. As shown in FIG. 16, the first information acquiring unit 1401 includes: a second receiving unit 1601, a second transmitting unit 1602 and a third receiving unit 1603; wherein, the second receiving unit 1601 is configured to receive a first subframe configuration requesting message transmitted by the home base station; the second transmitting unit 1602 is configured to transmit a second requesting message for acquiring the MBMS configuration information to the OAM of the macro base station according to the first subframe configuration requesting message; and the third receiving unit 1603 is configured to receive a second response message containing the MBMS configuration information acquired from the macro base station and returned by the OAM of the macro base station according to the second requesting message.

Figure 17:
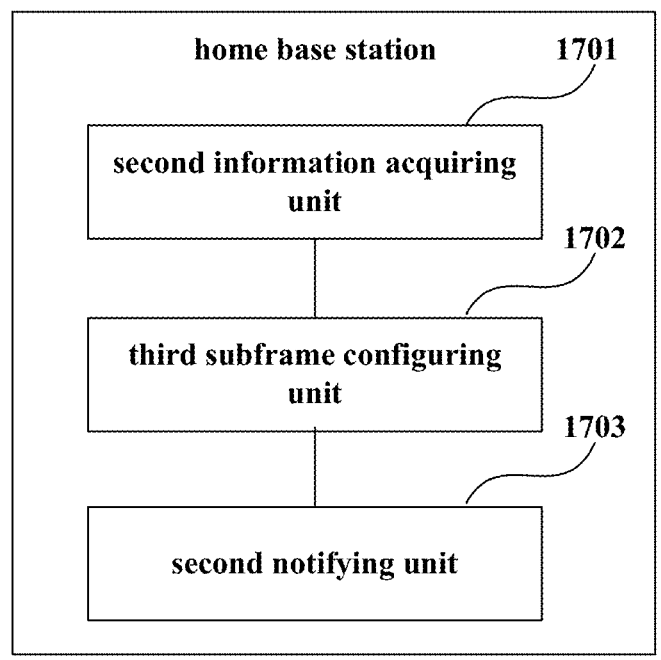
FIG. 17 is a schematic diagram of the structure of the home base station of Embodiment 13 of the present invention.

FIG. 17 is a schematic diagram of the structure of the home base station of Embodiment 13 of the present invention. As shown in FIG. 17, the home base station further includes a second information acquiring unit 1701 and a third subframe configuring unit 1702, with the functions of them being similar to those of the first information acquiring unit 1401 and the first subframe configuring unit 1402 in the OAM of the home base station in Embodiment 12, which shall not be described herein any further.

In this embodiment, the second information acquiring unit 1701 may acquire the MBMS configuration information of the macro cell from the UE of the macro cell or of the CSG cell.

As shown in FIG. 17, the home base station further includes a second notifying unit 1703 configured to notify the configured first ABS or the first ABS and MBSFN subframe to the UE of the home base station. Furthermore, if the MBMS configuration information includes the second MBMS configuration information, the second notifying unit 1703 notifies the second MBMS configuration information to the UE.

In an embodiment, the second information acquiring unit 1701 is configured to receive a second configuration updating message containing the MBMS configuration information transmitted by the macro base station, the detailed process being as described in Embodiment 6 shown in FIG. 8, which shall not be described herein any further.

Figure 18:
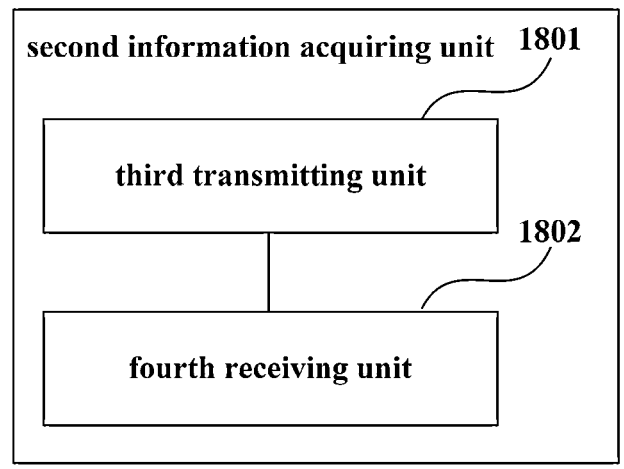
FIGS. 18 and 19 are schematic diagrams of the structure of the second information acquiring unit of FIG. 17.

In an embodiment, FIG. 18 is a schematic diagram of the structure of the second information acquiring unit of FIG. 17. As shown in FIG. 18, the second information acquiring unit 1701 includes: a third transmitting unit 1801 and a fourth receiving unit 1802; wherein, the third transmitting unit 1801 is configured to transmit a third requesting message for acquiring the MBMS configuration information to the macro base station; and the fourth receiving unit 1802 is configured to receive a third response message containing the MBMS configuration information returned by the macro base station according to the third requesting message, the detailed process being as described in Embodiment 5 shown in FIG. 7, which shall not be described herein any further.

Figure 19:
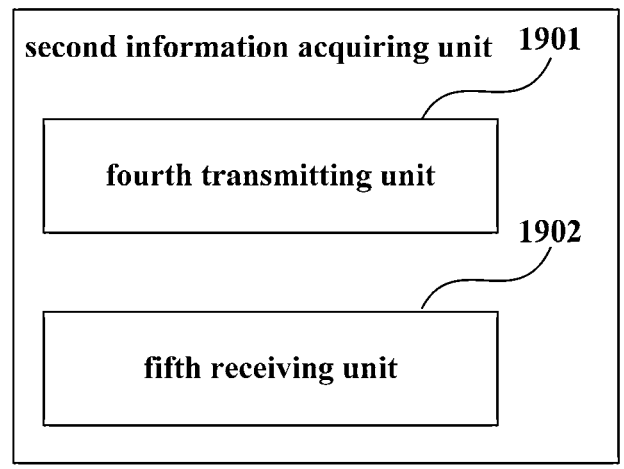

In another embodiment, FIG. 19 is a schematic diagram of the structure of the second information acquiring unit of FIG. 17. As shown in FIG. 19, the second information acquiring unit 1701 includes: a fourth transmitting unit 1901 and a fifth receiving unit 1902; wherein, the fourth transmitting unit 1901 is configured to transmit a fourth requesting message for acquiring the MBMS configuration information to the UE of the home base station; and the fifth receiving unit 1902 is configured to receive a fourth response message containing the monitored MBMS configuration information of the macro cell returned by the UE according to the fourth requesting message, the detailed process being as described in Embodiment 9 shown in FIG. 11, which shall not be described herein any further.

In a further embodiment, the second information acquiring unit 1801 is configured to receive the MBMS configuration information of the macro cell monitored by the UE of the home base station, the detailed process being as described in Embodiment 10 shown in FIG. 12, which shall not be described herein any further.

In still another embodiment, the second information acquiring unit 1801 is configured to receive via an MME of the home base station the second configuration updating message transmitted by the macro base station via the MME of the macro base station, the detailed process being as described in Embodiment 7 shown in FIG. 9, which shall not be described herein any further.

In an embodiment, the third transmitting unit 1801 shown in FIG. 18 is configured to transmit via the MME of the home base station the third requesting message for acquiring the MBMS configuration information to MME of the macro base station, so that the macro base station acquires the third requesting message via the MME of the macro base station; in such a case, the fourth receiving unit 1802 is configured to receive via the MME of the home base station the third response message returned by the macro base station via the MME of the macro base station, the detailed process being as described in Embodiment 8 shown in FIG. 10, which shall not be described herein any further.

Figure 20:
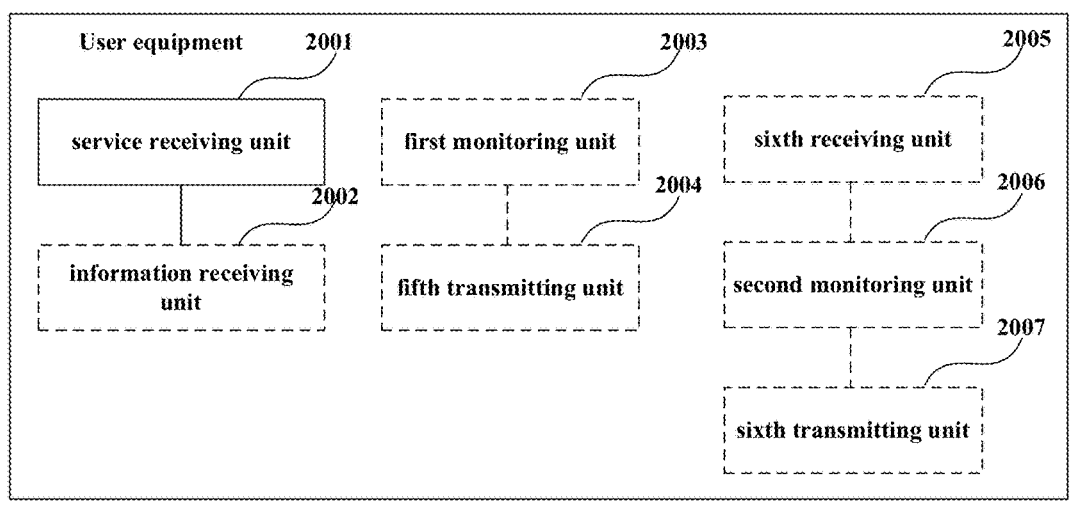
FIG. 20 is a schematic diagram of the structure of the user equipment of Embodiment 14 of the present invention.

FIG. 20 is a schematic diagram of the structure of the user equipment of Embodiment 14 of the present invention. As shown in FIG. 20, the UE includes a service receiving unit 2001 configured to receive a multimedia broadcast multicast service of a macro cell at a first ABS or a first ABS and MBSFN subframe configured by a home network side entity; wherein the position of the first ABS or the first ABS and MBSFN subframe is the same as the position of an MBSFN subframe of the macro cell.

As shown in FIG. 20, when subframe information is configured by an OAM of the home base station, the UE may further include an information receiving unit 2002 configured to receive second MBMS configuration information transmitted by the macro cell at a second ABS or a second ABS and MBSFN subframe configured by a home network side entity, the position of the second ABS or the second ABS and MBSFN subframe being the same as the position of the subframe of the macro cell for transmitting the second MBMS configuration information;

or, when the second MBMS configuration information is broadcasted by a home base station, the information receiving unit 2002 is configured to receive the second MBMS configuration information broadcasted by the home base station, the information receiving unit 2002 being optional;

wherein, the second MBMS configuration information includes one or more pieces of the following information:

MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging.

In this embodiment, the UE may further include a first configuration information receiving unit (not shown) configured to receive first subframe configuration information transmitted by the home base station, the first subframe configuration information including information of the first ABS or the first ABS and MBSFN subframe configured by the home network side entity on the CSG cell according to the acquired MBMS configuration information of the macro cell; wherein the MBMS configuration information of the macro cell includes first MBMS configuration information, the first MBMS configuration information including position information of an MBSFN subframe in the macro cell, so that the UE receives the MBMS at the subframe position.

Alternatively, the UE may further include a second configuration information receiving unit (not shown) configured to receive second subframe configuration information transmitted by the home base station, the second subframe configuration information including information of the second ABS or the second (ABS and MBSFN) subframe configured by the home network side entity on the CSG cell according to the acquired second MBMS configuration information of the macro cell, so that the UE receives the second MBMS configuration information at the subframe position.

As shown in FIG. 20, the UE may further include: a first monitoring unit 2003 and a fifth transmitting unit 2004; wherein, the first monitoring unit 2003 is configured to monitor the MBMS configuration information of the macro cell; and the fifth transmitting unit 2004 is configured to transmit updated MBMS configuration information of the macro cell to the home base station when updating of the MBMS configuration information in the macro cell is detected.

As shown in FIG. 20, the UE may further include: a sixth receiving unit 2005, a second monitoring unit 2006 and a sixth transmitting unit 2007; wherein, the sixth receiving unit 2005 is configured to receive a requesting message for acquiring the MBMS configuration information of the macro cell transmitted by the home base station; the second monitoring unit 2006 is configured to monitor the MBMS configuration information of the macro cell according to the requesting message; and the sixth transmitting unit 2007 is configured to transmit the monitored MBMS configuration information to the home base station;

wherein, the first monitoring unit 2003 and the fifth transmitting unit 2004, as well as the sixth receiving unit 2005, the second monitoring unit 2006 and the sixth transmitting unit 2007, are optional; and the UE may not include the above units, and may include one group of them.

It can be seen from the above embodiment that the HeNB of the CSG or the OAM of the HeNB may acquire the first MBMS configuration information containing the MBMS subframe position of the macro cell, and may perform configuration of the first ABS or the first (ABS+MBSFN) subframe according to the first MBMS configuration information. In this way, the UE may receive the MBMS of the macro cell in the configured first ABS or first (ABS+MBSFN) subframe, thereby ensuring that the MBMS is not interrupted after the UE is handed over to the CSG cell, or ensuring that the UE of the CSG cell receives the MBMS of the macro cell.

Furthermore, the HeNB of the CSG or the OAM of the HeNB may further acquire the second MBMS configuration information, as described above. In this way, when the UE receives the MBMS data, if relevant information of the control channel changes, the UE may further obtain corresponding information, so as to further ensure the integrity of data reception in case of making the reception of the MBMS data uninterrupted.

In this embodiment, for example, when the UE receiving the MBMS of the macro cell is handed over from the macro cell to the CSG, or the UE in the CSG cell is to receive the MBMS, or the UE in the CSG cell starts to receive the MBMS, the method for carrying out MBMS of the embodiments of the present invention may be employed.

An embodiment of the present invention further provides a computer-readable program, wherein when the program is executed in a network management system of a home base station, the program enables a computer to carry out the method for carrying out a multimedia broadcast multicast service as described in embodiments 1-4 in the OAM of a home base station.

An embodiment of the present invention further provides a storage medium in which a computer-readable program is stored, wherein the computer-readable program enables a computer to carry out the method for carrying out a multimedia broadcast multicast service as described in embodiments 1-4 in a network management system of a home base station.

An embodiment of the present invention further provides a computer-readable program, wherein when the program is executed in a home base station, the program enables a computer to carry out the method for carrying out a multimedia broadcast multicast service as described in embodiments 1 and 5-10 in the home base station.

An embodiment of the present invention further provides a storage medium in which a computer-readable program is stored, wherein the computer-readable program enables a computer to carry out the method for carrying out a multimedia broadcast multicast service as described in embodiments 1 and 5-10 in a home base station.

An embodiment of the present invention further provides a computer-readable program, wherein when the program is executed in UE, the program enables a computer to carry out the method for carrying out a multimedia broadcast multicast service as described in embodiment 11 in the UE.

An embodiment of the present invention further provides a storage medium in which a computer-readable program is stored, wherein the computer-readable program enables a computer to carry out the method for carrying out a multimedia broadcast multicast service as described in embodiment 11 in UE.

One or more functional blocks and/or one or more combinations of the functional blocks in FIGS. 13-20 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

Although particular examples of the present invention are described in this application, variants of the present invention may be designed by a person of an ordinary skill in the art without departing from the concept of the present invention.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A method for carrying out a multimedia broadcast multicast service, comprising:
   acquiring, by a home network side entity, multimedia broadcast multicast service (MBMS) configuration information of a macro cell, the MBMS configuration information of the macro cell comprising first MBMS configuration information, the first MBMS configuration information comprising position information of a multimedia broadcast multicast single frequency network (MBSFN) subframe in the macro cell; and configuring a subframe of a closed subscriber group (CSG) cell at a position which is the same as that of the MBSFN subframe of the macro cell into a first almost blank subframe (ABS) or into a first ABS and MBSFN subframe, according to the acquired first MBMS configuration information, so that user equipment (UE) receives multimedia broadcast multicast service of the macro cell at the configured first ABS or the configured first ABS and the MBSFN subframe;

wherein the MBMS configuration information further comprises second MBMS configuration information, the second MBMS configuration information comprising one or more pieces of the following information:

MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging;

wherein the home network side entity is a network management system (OAM) of a home base station or a home base station.

2. The method according to claim 1, wherein the home network side entity acquires the MBMS configuration information of the macro cell from the macro cell or from UE of the CSG cell.

3. The method according to claim 1, wherein the home network side entity is a network management system (OAM) of a home base station, and the step of acquiring the MBMS configuration information of a macro cell by the home network side entity comprises:

receiving, by the network management system of the home base station, a first configuration updating message containing the MBMS configuration information transmitted by a macro base station, via a network management system of the macro base station; or the step of acquiring the MBMS configuration information of a macro cell by a home network side entity comprises:

transmitting, by the network management system of the home base station, a first requesting message for acquiring the MBMS configuration information, to a network management system of a macro base station; and receiving a first response message containing the MBMS configuration information acquired from the macro base station and returned by the network management system of the macro base station according to the first requesting message; or the step of acquiring the MBMS configuration information of a macro cell by a home network side entity comprises:

receiving, by the network management system of the home base station, a first subframe configuration requesting message transmitted by the home base station;

transmitting, by the network management system of the home base station, a second requesting message for acquiring the MBMS configuration information to a network management system of a macro base station, according to the first subframe configuration requesting message; and receiving a second response message containing the MBMS configuration information acquired from the macro base station and returned by the network management system of the macro base station according to the second requesting message.

4. The method according to claim 1, wherein when the home network side entity is a network management system of a home base station, the method further comprises:

transmitting, by the network management system of the home base station, the position information of the configured first ABS or the first ABS and MBSFN subframe to the home base station, and notifying the UE of the home base station by the home base station.

5. The method according to claim 1, wherein the home network side entity is a home base station, and the step of acquiring MBMS configuration information of a macro cell by the home network side entity comprises:

receiving, by the home base station, a second configuration updating message containing the MBMS configuration information transmitted by a macro base station; or the step of acquiring MBMS configuration information of a macro cell by the home network side entity comprises:

transmitting, by the home base station, a third requesting message for acquiring the MBMS configuration information to a macro base station; and receiving a third response message containing the MBMS configuration information returned by the macro base station according to the third requesting message; or the step of acquiring MBMS configuration information of a macro cell by the home network side entity comprises:

transmitting, by the home base station, a fourth requesting message for acquiring the MBMS configuration information to the UE of the home base station; and receiving a fourth response message containing monitored MBMS configuration information of the macro cell returned by the UE according to the fourth requesting message; or the step of acquiring MBMS configuration information of a macro cell by the home network side entity comprises:

receiving by the home base station the MBMS configuration information of the macro cell monitored by the UE of the home base station.

6. A home network side entity, comprising:

a memory that stores a plurality of instructions; and a processor coupled to the memory and configured to execute the instructions to:

acquire multimedia broadcast multicast service (MBMS) configuration information of a macro cell, the MBMS configuration information of the macro cell comprising first MBMS configuration information, the first MBMS configuration information comprising position information of a multimedia broadcast multicast single frequency network (MBSFN) subframe in the macro cell; and configure a subframe of a closed subscriber group (CSG) cell at a position which is the same as that of the MBSFN subframe of the macro cell into a first ABS or a first ABS and MBSFN subframe according to the acquired first MBMS configuration information, so that user equipment (UE) receives multimedia broadcast multicast service of the macro cell at the configured first ABS or the configured first ABS and the MBSFN subframe;

wherein the MBMS configuration information further comprises second MBMS configuration information, the second MBMS configuration information comprising one or more pieces of the following information:

MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging;

wherein the home network side entity is a network management system (OAM) of a home base station or a home base station.

7. The home network side entity according to claim 6, wherein the home network side entity is a network management system (OAM) of a home base station, and the processor further execute the instructions to receive a first configuration updating message containing the MBMS configuration information transmitted by a macro base station via a network management system of the macro base station; or the processor further execute the instructions to:
transmit a first requesting message for acquiring the MBMS configuration information to a network management system of a macro base station; and
receive a first response message containing the MBMS configuration information acquired from a macro base station and returned by a network management system of the macro base station according to the first requesting message; or
the processor further execute the instructions to:
receive a first subframe configuration requesting message transmitted by the home base station;
transmit a second requesting message for acquiring the MBMS configuration information to a network management system of a macro base station according to the first subframe configuration requesting message; and
receive a second response message containing the MBMS configuration information acquired from a macro base station and returned by a network management system of the macro base station according to the second requesting message.

8. The home network side entity according to claim 6, wherein the home network side entity is an network management system of an home base station, and the processor is further configured to execute instructions to notify the position information of the first ABS or the first ABS and MBSFN subframe to the home base station.

9. The home network side entity according to claim 6, wherein the home network side entity is a network management system, the processor is further configured to execute instructions:

to configure a subframe of a CSG cell at a position which is the same as that of the subframe of the macro cell for transmitting the second MBMS configuration information into a second ABS or a second ABS and MBSFN subframe, according to the second MBMS configuration information, so that the UE receives the second MBMS configuration information from the macro cell; and transmit the position information of the configured second ABS or second ABS and MBSFN subframe to a home base station, which is transmitted by the home base station to the UE of the home base station.

10. The home network side entity according to claim 6, wherein the home network side entity is a home base station, and the processor is further configured to execute instructions to receive a second configuration updating message containing the MBMS configuration information transmitted by a macro base station; or the processor is further configured to execute the instructions to:
transmit a third requesting message for acquiring the MBMS configuration information to a macro base station; and
receive a third response message containing the MBMS configuration information returned by the macro base station according to the third requesting message; or
the processor is further configured to execute the instructions to:
transmit a fourth requesting message for acquiring the MBMS configuration information to the UE of the home base station; and
receive a fourth response message containing monitored MBMS configuration information of the macro cell returned by the UE according to the fourth requesting message; or
the processor is further configured to execute the instructions to receive the MBMS configuration information of the macro cell monitored by the UE of the home base station.

11. The home network side entity according to claim 10, wherein the processor is further configured to execute the instructions to receive a second configuration updating message containing the MBMS configuration information transmitted by a macro base station, comprising: receive via a mobile management entity (MME) of the home base station the second configuration updating message transmitted by the macro base station via the MME of the macro base station.

12. The home network side entity according to claim 10, wherein the processor is further configured to execute the instructions to transmit via a mobile management entity (MME) of the home base station the third requesting message for acquiring the MBMS configuration information to MME of the macro base station, so that the macro base station acquires the third requesting message via the MME of the macro base station; and the processor is further configured to execute the instructions to receive via the MME of the home base station the third response message returned by the macro base station via the MME of the macro base station.

13. The home network side entity according to claim 6, wherein the home network side entity is a home base station, the processor further configured to execute the instructions to:

notify the second MBMS configuration information to the UE of the home base station, and/or notify the position information of the configured first ABS or the first ABS and MBSFN subframe to the UE of the home base station.

14. User equipment (UE), comprising:
a memory that stores a plurality of instructions; and
a processor coupled to the memory and configured to execute the instructions to:

receive a multimedia broadcast multicast service of a macro cell at a first ABS or a first ABS and MBSFN subframe configured by a home network side entity;

wherein a position of the first ABS or the first ABS and MBSFN subframe is the same as the position of an MBSFN subframe of the macro cell;

wherein the home network side entity is a network management system (OAM) of a home base station or a home base station;

the processor is further configured to execute the instructions to: receive second MBMS configuration information;

wherein the second MBMS configuration information comprises one or more pieces of the following information:

MBMS control channel configuration change indication information, MBMS control channel configuration information, MBSFN region configuration information transmitted in an MBMS control channel containing relevant information of a physical broadcast multicast channel for MBMS data receiving, scheduling information of relevant system information, and information about paging.

15. The UE according to claim 14, wherein the processor is further configured to execute the instructions to:

receive the second MBMS configuration information transmitted by the macro cell at a second ABS or a second ABS and MBSFN subframe configured by a home network side entity, a position of the second ABS or the second ABS and MBSFN subframe being the same as the position of the subframe of the macro cell for transmitting the second MBMS configuration information; or, to receive the second MBMS configuration information broadcasted by an home base station.

16. The UE according to claim 14, wherein the UE further comprises:

the processor is further configured to execute the instructions to receive first subframe configuration information transmitted by a home base station, the first subframe configuration information comprising information of the first ABS or the first ABS and MBSFN subframe configured by the home network side entity on a CSG cell according to acquired MBMS configuration information of the macro cell;

wherein, the MBMS configuration information of the macro cell comprises first MBMS configuration information, the first MBMS configuration information comprising position information of an MBSFN subframe in the macro cell.

17. The UE according to claim 15, wherein the processor is further configured to execute the instructions to:

receive second subframe configuration information transmitted by the home base station, the second subframe configuration information comprising information of the second ABS or the second ABS and MBSFN subframe configured by the home network side entity on a CSG cell according to the acquired second MBMS configuration information of the macro cell.

18. The UE according to claim 14, wherein the processor is further configured to execute the instructions to:

monitor the MBMS configuration information of the macro cell; and transmit updated MBMS configuration information of the macro cell to a home base station when updating of the MBMS configuration information in the macro cell is detected.

19. The UE according to claim 14, wherein the processor is further configured to execute the instructions to:

receive a requesting message for acquiring the MBMS configuration information of the macro cell transmitted by the home base station;

monitor the MBMS configuration information of the macro cell according to the requesting message; and transmit the monitored MBMS configuration information to the home base station.

* * * * *